(12) United States Patent
Magin et al.

(10) Patent No.: US 9,325,374 B2
(45) Date of Patent: Apr. 26, 2016

(54) POWERLINE COMMUNICATION DIVERSITY COUPLING TECHNIQUE

(71) Applicant: QUALCOMM Incorporated, San Diego, CA (US)

(72) Inventors: Gregory Allen Magin, Ocala, FL (US); Lawrence W. Yonge, III, Summerfield, FL (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 13/723,096

(22) Filed: Dec. 20, 2012

(65) Prior Publication Data
US 2013/0335207 A1 Dec. 19, 2013

Related U.S. Application Data

(60) Provisional application No. 61/660,653, filed on Jun. 15, 2012.

(51) Int. Cl.
*G05B 11/01* (2006.01)
*H04B 3/56* (2006.01)
*H04B 3/54* (2006.01)

(52) U.S. Cl.
CPC .. *H04B 3/54* (2013.01); *H04B 3/56* (2013.01); *H04B 2203/5466* (2013.01); *H04B 2203/5483* (2013.01); *H04B 2203/5491* (2013.01)

(58) Field of Classification Search
CPC ................. H04B 2203/542; H04B 2203/5416; H04B 2203/5441; H04B 2203/5466; H04B 2203/5483; H04B 2203/5491; H04B 3/54; H04B 3/56
USPC ...................................................... 340/12.37
See application file for complete search history.

(56) References Cited

U.S. PATENT DOCUMENTS

| 4,188,619 | A | * | 2/1980 | Perkins | .................... H04B 3/56 307/3 |
| 4,675,648 | A | * | 6/1987 | Roth | ........................ H04B 3/56 307/104 |

(Continued)

FOREIGN PATENT DOCUMENTS

| CN | 1627627 | 6/2005 |
| CN | 1665113 | 9/2005 |

(Continued)

OTHER PUBLICATIONS

PCT Application No. PCT/US2013/045897 International Search Report, 10 pages, Sep. 26, 2013.

(Continued)

*Primary Examiner* — Firmin Backer
*Assistant Examiner* — Adnan Aziz
(74) *Attorney, Agent, or Firm* — DeLizio Law, PLLC

(57) ABSTRACT

A powerline communication diversity coupling mechanism may implement a transformer coupling unit. The transformer coupling unit can receive a communication signal to be coupled to a plurality of powerline communication channels for transmission in a powerline communication network. The transformer coupling unit can split the communication signal into a plurality of communication signals for transmission. The transformer coupling unit can couple each of the plurality of the communication signals to a corresponding one of a plurality of the powerline communication channels for transmission in the powerline communication network. Also, the transformer coupling unit can receive a plurality of communication signals on each of a plurality of powerline communication channels. The transformer coupling unit can combine the plurality of the communication signals into a communication signal. The transformer coupling unit may then couple the communication signal to an analog front end and other processing units for processing the communication signal.

41 Claims, 5 Drawing Sheets

(56) References Cited

U.S. PATENT DOCUMENTS

| | | | |
|---|---|---|---|
| 5,485,040 A * | 1/1996 | Sutterlin | H04B 3/56 307/104 |
| 7,170,465 B2 | 1/2007 | Rofougaran et al. | |
| 7,187,276 B2 * | 3/2007 | Kline | G02B 6/483 307/3 |
| 7,356,086 B1 * | 4/2008 | Landry | H04B 3/56 340/538 |
| 7,633,774 B2 | 12/2009 | Ichihara | |
| 7,801,166 B2 | 9/2010 | Beaucage | |
| 8,213,582 B2 * | 7/2012 | Hurwitz | H04M 11/062 379/394 |
| 8,228,924 B2 * | 7/2012 | Dawson | H04B 3/54 370/401 |
| 8,816,832 B2 * | 8/2014 | Weiss | H04B 3/56 307/104 |
| 2004/0130413 A1 * | 7/2004 | Mentz | H04B 3/56 333/167 |
| 2004/0196144 A1 * | 10/2004 | Crenshaw et al. | 340/310.01 |
| 2008/0267301 A1 * | 10/2008 | Alfano | H01L 23/48 375/258 |
| 2008/0273613 A1 * | 11/2008 | Kol | 375/260 |
| 2009/0232286 A1 * | 9/2009 | Hurwitz | 379/93.01 |
| 2009/0315700 A1 | 12/2009 | Hurwitz et al. | |
| 2010/0246648 A1 * | 9/2010 | Rocamora et al. | 375/222 |
| 2011/0026621 A1 * | 2/2011 | Kim et al. | 375/260 |
| 2012/0093198 A1 * | 4/2012 | Dabak | H04B 3/542 375/257 |
| 2013/0215981 A1 * | 8/2013 | Fornage | H04B 3/54 375/257 |

FOREIGN PATENT DOCUMENTS

| | | |
|---|---|---|
| CN | 1738173 | 2/2006 |
| CN | 2800338 | 7/2006 |
| CN | 101009503 | 8/2007 |
| CN | 101043183 | 9/2007 |
| CN | 200966023 | 10/2007 |
| CN | 101689043 | 3/2010 |
| FR | 2867331 | 9/2005 |
| FR | 2867331 A1 * | 9/2005 |
| KR | 20030081648 A | 10/2003 |

OTHER PUBLICATIONS

Co-pending U.S. Appl. No. 61/660,653, filed Jun. 15, 2012, 22 pages.

"PCT Application No. PCT/US2013/045897 Written Opinion of the IPEA", Jun. 23, 2014, 5 pages.

"Taiwan Patent Application No. 201406088 Office Action", Jan. 16, 2015, 27 pages.

"Taiwan Search Report—TW102120425—TIPO—Jan. 14, 2015", Jan. 14, 2015, 1 page.

Cavdar, et al., "Measurements of Impedance and Attenuation at CENELEC Bands for Power Line Communications Systems", Open Access Sensors (Dec. 8, 2008), Jan. 16, 2015, 10 pages.

"Taiwan Application No. 102120425, TIPO Search Report", Jan. 14, 2015, 2 page.

"Taiwan Application No. 102120425, Office Action", Jul. 3, 2015, 17 pages.

* cited by examiner

POWERLINE COMMUNICATION DIVERSITY COUPLING TECHNIQUE

RELATED APPLICATIONS

This application claims the priority benefit of U.S. Provisional Application Ser. No. 61/660,653 filed Jun. 15, 2012.

BACKGROUND

Embodiments of the inventive subject matter generally relate to the field of communication systems and, more particularly, to diversity coupling techniques in powerline communication systems.

Powerline communication (PLC) is a wired communication technology that utilizes electrical power wiring for transmitting and receiving communication signals. PLC techniques typically utilize line and neutral wires of electrical outlets for transmitting and receiving communication signals. However, with three available wires (i.e., Line, Neutral, and Protective Earth or Ground), three wire pairs (or powerline communication channels) are possible: Line/Neutral, Line/Ground, and Neutral/Ground. More than one available powerline communication channels can be utilized to implement diversity schemes in PLC networks. Diversity schemes improve the reliability of a communication signal by using two or more powerline communication channels with different characteristics. Diversity schemes can also help in achieving improved signal-to-noise (SNR) ratios and increased data rates.

SUMMARY

Various embodiments are disclosed for diversity coupling in a powerline communication system. In one embodiment, a communication signal to be coupled to a plurality of powerline communication channels for transmission is received. The communication signal is split into a plurality of communication signals for transmission. Each of the plurality of the communication signals is coupled to a corresponding one of a plurality of the powerline communication channels for transmission in a powerline communication network.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to a PLC diversity coupling module to implement diversity coupling techniques for a two channel PLC system, embodiments are not so limited. In some implementations, the PLC diversity coupling techniques described herein may also be implemented for an N-channel PLC system. In other instances, well-known instruction instances, protocols, structures and techniques have not been shown in detail in order not to obfuscate the description.

A PLC system can utilize a second powerline communication channel by selecting one of the available channels other than the Line/Neutral channel (e.g., a Line/Ground channel). A two channel PLC system typically includes separate hardware units (e.g., an analog front end unit including a transmitting amplifier, a receiving low noise amplifier, etc.) for each channel. However, utilizing separate hardware units incurs significant overhead as both channels are usually monitored periodically. Also, utilizing separate hardware units for each channel allows the use of the second channel, but increases hardware costs and power consumption.

In some embodiments, a PLC diversity coupling module splits a communication signal and transmits the communication signal on two channels (e.g., on the Line/Neutral channel and the Line/Ground channel) by utilizing a dual transformer coupling unit or a single transformer coupling unit with two secondary windings. The PLC diversity coupling module also combines differential signals received on the two channels by utilizing the dual transformer coupling unit or the single transformer coupling unit with two secondary windings, as will be further described below with reference to FIGS. 1 and 2. The PLC diversity coupling module may also utilize a common set of one or more hardware units (e.g., an analog front end unit, coupling components, etc.) to implement a diversity technique. In some implementations, the transmitter of the PLC diversity coupling module may simultaneously transmit over (or drive) two of the available powerline communication channels (e.g., any two pairs of the available wires) with the same communication signal. The receiver of the PLC diversity coupling module may combine the same signal from the two powerline communication channels, as will be further described below. The PLC diversity coupling module can implement a diversity scheme with low power consumption, less complexity, little to no protocol overhead, and low costs.

Figure 1:
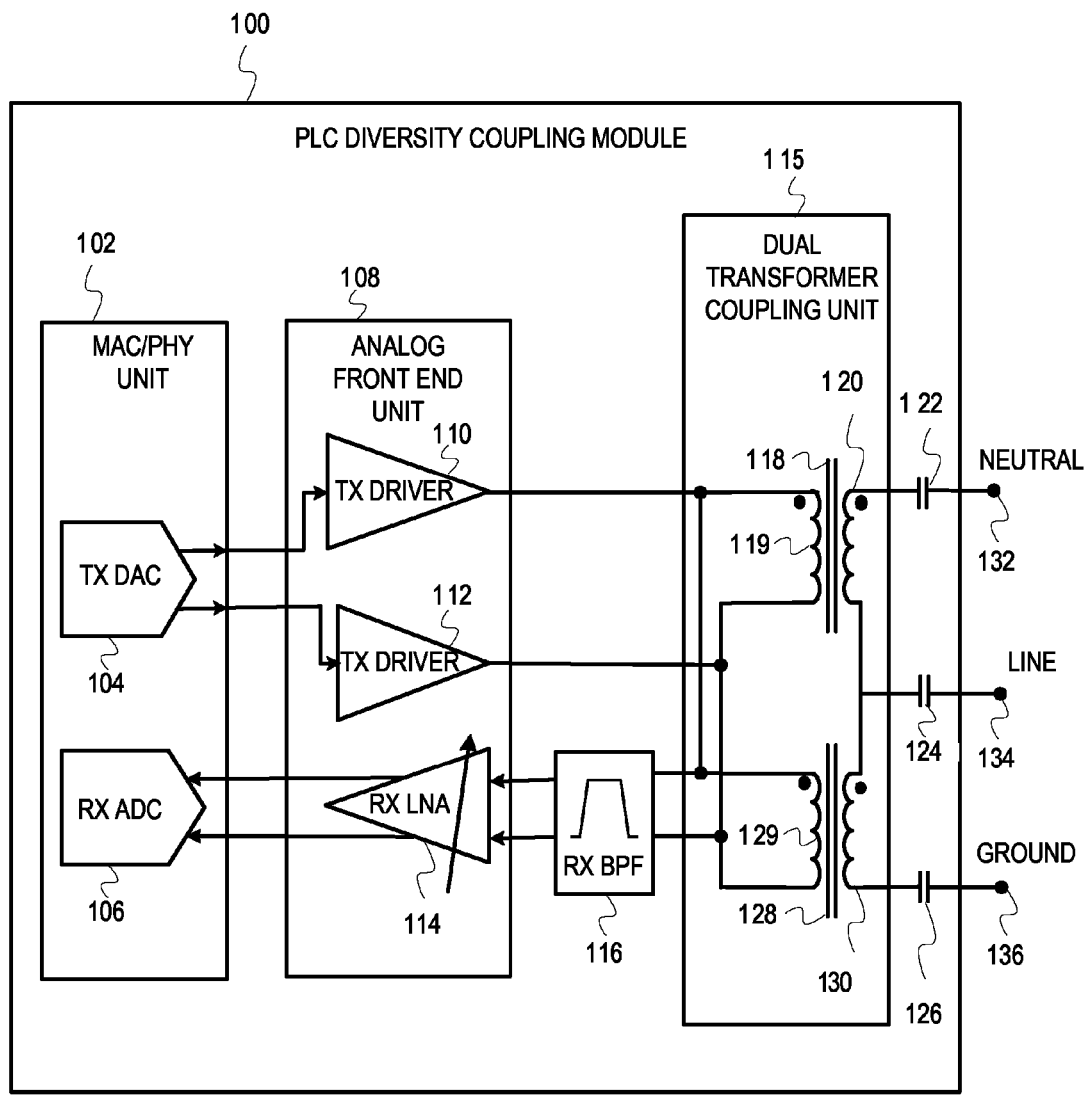
FIG. 1 depicts an example conceptual diagram of a PLC diversity coupling module having a dual transformer coupling unit.

FIG. 1 depicts an example conceptual diagram of a PLC diversity coupling module 100 having a dual transformer coupling unit 115. As illustrated, the PLC diversity coupling module 100 can include a Media Access Control/Physical Layer (MAC/PHY) unit 102 having a transmitter digital-to-analog converter (TX DAC) 104 and a receiver analog-to-digital converter (RX ADC) 106. In some implementations, the MAC/PHY unit 102 may implement one or more functions of the Physical Layer (e.g., modulation, line coding, bit-synchronization, demodulation, etc.). The MAC/PHY unit 102 may also implement one or more functions of the Media Access Control layer (e.g., frame transmission, frame reception, inter-frame gap enforcement, etc.). For example, the MAC/PHY unit 102 can include hardware and software units (not shown) to implement functions of the Physical Layer and the Media Access Control Layer. For simplification, FIG. 1 does not include all the components of the MAC/PHY unit 102 and also does not include all the components of the rest of the PLC diversity coupling module 100.

The PLC diversity coupling module 100 may also include an analog front end (AFE) unit 108 having an amplifier TX driver 110, an amplifier TX driver 112, and a low noise amplifier RX LNA 114. In one example, the AFE unit 108 is a signal processing unit and includes components to interface the MAC/PHY unit 102 with the dual transformer coupling unit 115. In some implementations, the TX driver 110 and the TX driver 112 amplify communication signals before transmission and the RX LNA 114 amplifies a received signal filtered by a receiver band-pass filter (RX BPF) 116.

As shown in FIG. 1, the dual transformer coupling unit 115 can comprise a coupling transformer 118 and a coupling transformer 128. The coupling transformer 118 may include a low voltage (or primary) winding 119 and a high voltage (or secondary) winding 120. The coupling transformer 128 may include a low voltage (or primary) winding 129 and a high voltage (or secondary) winding 130. In one example, the high voltage winding 120 is coupled with a neutral wire 132 and a line wire 134 (i.e., the high voltage winding 120 is coupled with the Line/Neutral channel) via coupling capacitors 122 and 124, respectively. For example, a first terminal of the high voltage winding 120 is coupled with a neutral wire connector configured to couple the neutral wire 132 (via coupling capacitor 122), and the second terminal of the high voltage winding 120 is coupled with a line wire connector configured to couple to the line wire 134 (via the coupling capacitor 124). The high voltage winding 130 is coupled with the line wire 134 and a ground wire 136 (i.e., the high voltage winding 130 is coupled with the Line/Ground channel) via the coupling capacitor 124 and a coupling capacitor 126, respectively. For example, a first terminal of the high voltage winding 130 is coupled with the line wire connector configured to couple to the line wire 134 (via coupling capacitor 124), and the second terminal of the high voltage winding 130 is coupled with a ground wire connector configured to couple the ground wire 136 (via the coupling capacitor 126). Furthermore, as shown in FIG. 1, the first terminal of the low voltage winding 119 is coupled with the TX driver 110 and also to the first input terminal of the RX BPF 116. The second terminal of the low voltage winding 119 is coupled with the TX driver 112 and also to the second input terminal of the RX BPF 116. The first output terminal of the RX BPF 116 is coupled with the first input terminal of the RX LNA 114, and the second output terminal of the RX BPF 116 is coupled with the second input terminal of the RX LNA 114. The output terminals of the RX LNA 114 are coupled with the RX ADC 106, and the TX DAC 104 is coupled with the TX drivers 110 and 112.

In some embodiments, the PLC diversity coupling module 100 can be included in a PLC network device (e.g., a desktop, a laptop, a television, a washing machine, etc.) to implement the PLC diversity techniques. In other embodiment, the PLC diversity coupling module 100 may be a standalone PLC plugin adapter which can be interfaced to one or more components of a PLC network device. The PLC plugin adapter can connect to the Line, Neutral and Ground terminals of an electrical wall socket. The PLC plugin adapter can also include one or more network interfaces (e.g., an Ethernet interface, a WLAN interface, etc.) to connect with a PLC network device. The PLC diversity coupling module 100 utilizes the MAC/PHY unit 102, the AFE unit 108 and the RX BPF 116 for both the Line/Neutral and Line/Ground channels and hence reduces the hardware utilized to implement a diversity technique. By reducing the hardware utilized, the PLC diversity coupling module 100 reduces power consumption and complexity for implementing the diversity technique. The PLC diversity coupling module 100 also incurs lower costs and little to no protocol overhead.

In one implementation, the TX DAC 104 converts a digital signal received from other processing components of the MAC/PHY unit 102 into an analog signal for transmission. The TX driver 110 and the TX driver 112 drive a communication signal (e.g., a differential analog signal) from the TX DAC 104 into the low voltage windings 119 and 129. In some implementations, the TX driver 110 and the TX driver 112 amplify the communication signal to drive it into the low voltage windings 119 and 129. The coupling transformers 118 and 128 couple the communication signal from the low voltage windings 119 and 129 into the high voltage windings 120 and 130, respectively. The communication signal is transmitted over both the Line/Neutral channel and the Line/Ground channel (i.e., over at least two channels) to achieve channel diversity. The coupling capacitors 122, 124 and 126 can prevent large current flow through the coupling transformers 118 and 128 at electrical frequencies (e.g., 50 Hz or 60 Hz) into components of a powerline communication device. In some implementations, the line wire 134 may not include the coupling capacitor 124, and the coupling capacitors 122 and 126 are utilized for limiting large currents. Although not depicted in FIG. 1, in some implementations, resistors may be added in series with the neutral wire 132 and the ground wire 136 to provide isolation. For example, resistors added in series with the neutral wire 132 and the ground wire 136 limit surge currents and provide isolation to the TX drivers 110 and 112 from high magnitude currents. In one implementation, the resistors can also aid in achieving an equal current flow in the Line/Neutral and Line/Ground channels. Furthermore, the resistors may reduce interaction between the powerline communication channels (i.e., Line/Neutral and Line/Ground) and reduce loading if one powerline communication channel presents low impedance.

During a transmission mode, the communication signal driven by the TX drivers 110 and 112 is split across the coupling transformers 118 and 128. Also, substantially identical communication signals arriving on the Line/Ground and the Line/Neutral channels are combined during a receive mode. The communication signals arriving on the Line/Neutral and the Line/Ground channels may have minor variances (e.g., path difference, signal attenuation, etc.) due to variation in channel properties (e.g., channel length, discontinuities, etc.). However, the Line/Ground communication channel and the Line/Neutral communication channels are reasonably matched, and the received communication signals tend to be substantially identical in response with no significant degradation effects. Signal splitting and signal combining is based on the impedances of the Line/Neutral and Line/Ground channels. When the impedances are equal, a communication signal is equally split across the two channels. Also, when the impedances are equal, the substantially identical communication signals arriving on the Line/Ground and the Line/Neutral channels are combined in equal proportion. In the depicted embodiment, the impedances of the Line/Neutral and Line/Ground channels are balanced and communication signals are split/combined equally. In some implementations, with equal contribution from the Line/Ground and Line/Neutral channels, the PLC diversity coupling module 100 comprising a single AFE unit 108 and the dual transformer coupling unit 115 can achieve improvements in SNR. In some examples, the dual transformer coupling unit 115 can achieve improvements in SNR of up to 40%. Therefore, signal splitting and signal combining on the Line/Neutral and the Line/Ground communication channels can increase system data rates. It is noted, however, that embodiments are not limited to splitting/combining the signals equally, and in some embodiments, unequal signal combining/splitting can be implemented, as will be described further below.

During a receive mode, the RX BPF 116 filters the combined signal (i.e., the received communication signal combined from the Line/Neutral and Line/Ground channels). The TX drivers 110 and 112 are in a high impedance mode during the receive mode and therefore the received communication signal is provided to the RX BPF 116. The RX BPF 116 is configured to remove the frequency components outside a powerline communication band (e.g., 1.8 MHz-60 MHz) from the received communication signal. The RX LNA 114 amplifies the communication signal filtered by the RX BPF 116. In some implementations, a separate band-pass filter and a separate low noise amplifier filter may amplify the communication signals received on the Line/Neutral and the Line/Ground channels, respectively. The filtered and amplified communication signals may then be combined before being sent to the RX ADC 106. In some implementations, filtering and amplifying the communication signals separately, allows less interdependence between the communication signals from the Line/Neutral and Line/Ground channels. The RX ADC 106 converts an amplified analog signal to a digital signal to be utilized by one or more processing components of the powerline communication device.

In some implementations, the coupling transformer 118 includes two low voltage windings. A first low voltage winding is coupled to the TX drivers 110 and 112. A second low voltage winding is coupled to the RX BPF 116. The first low voltage winding and the second low voltage winding may have an unequal number of turns. The unequal number of turns allows the transmit path for the Line/Neutral channel to have a different turns ratio than the receive path for the Line/Neutral channel. Similarly, the coupling transformer 128 may also include two voltage windings (i.e., a first low voltage winding coupled to the TX drivers 110 and 112, and a second low voltage winding coupled to the RX BPF 116) having an unequal number of turns. The unequal number of turns allows the transmit path for the Line/Ground channel to have a different turns ratio than the receive path for the Line/Ground channel.

It is noted that in some embodiments the number of turns on the low voltage winding 119, the low voltage winding 129, the high voltage winding 120 and the high voltage winding 130 are equal. In some implementations, an unequal number of turns on either of the windings of the coupling transformers 118 or 128 allow unequal splitting/combining of communication signals. In some implementations, unequal splitting/combining of the communication signals may be utilized when one of the powerline communication channels has better performance (e.g., low attenuation, high signal to noise ratio, etc.) compared to a second powerline communication channel. Unequal splitting/combining of the communication signals may allow utilizing unequal contribution from the powerline communication channels for sending/receiving a communication signal. Unequal splitting/combining of the communication signals can be achieved based on the number of turns on the windings of the coupling transformers 118 and 128. For example, the number of turns on the low voltage winding 119 and the high voltage winding 120 of the coupling transformer 118 is greater than the number of turns on the low voltage winding 129 and the high voltage winding 130. When a communication signal received from the AFE unit 108 is to be transmitted, the dual transformer coupling unit 115 can split the communication signal into two communication signals of unequal proportions (e.g., a first signal with a larger proportion and a second signal with a smaller proportion of the communication signal received from the AFE unit 108). The coupling transformer 118 couples the first signal to the Line/Neutral communication channel and the coupling transformer 128 couples the second signal to the Line/Ground communication channel. Similarly, in some implementations, when communication signals are received on the Line/Neutral and Line/Ground communication channels, the dual transformer coupling unit 115 can unequally combine the communication signals in unequal proportions. For example, the dual transformer coupling unit 115 may combine the communication signals with a larger proportion of the communication signal received from the Line/Neutral communication channel and a smaller proportion of the communication signal received from the Line/Ground communication channel.

FIG. 1 depicts a mechanism for driving communication signals into the high voltage windings 120 and 130 in a same phase (as represented by the dot convention). The phase relationship of the Line/Neutral and Line/Ground channels can be adjusted by reversing the connections at one of the high voltage windings. Communication signals may be driven into the Line/Neutral channel and the Line/Ground channel in the same phase, or in an opposite phase. Different configurations of windings, and hence different phase relationships allow transmission and reception of signals for optimum communication (e.g., high SNR) and/or minimum radiated emissions.

Figure 2:
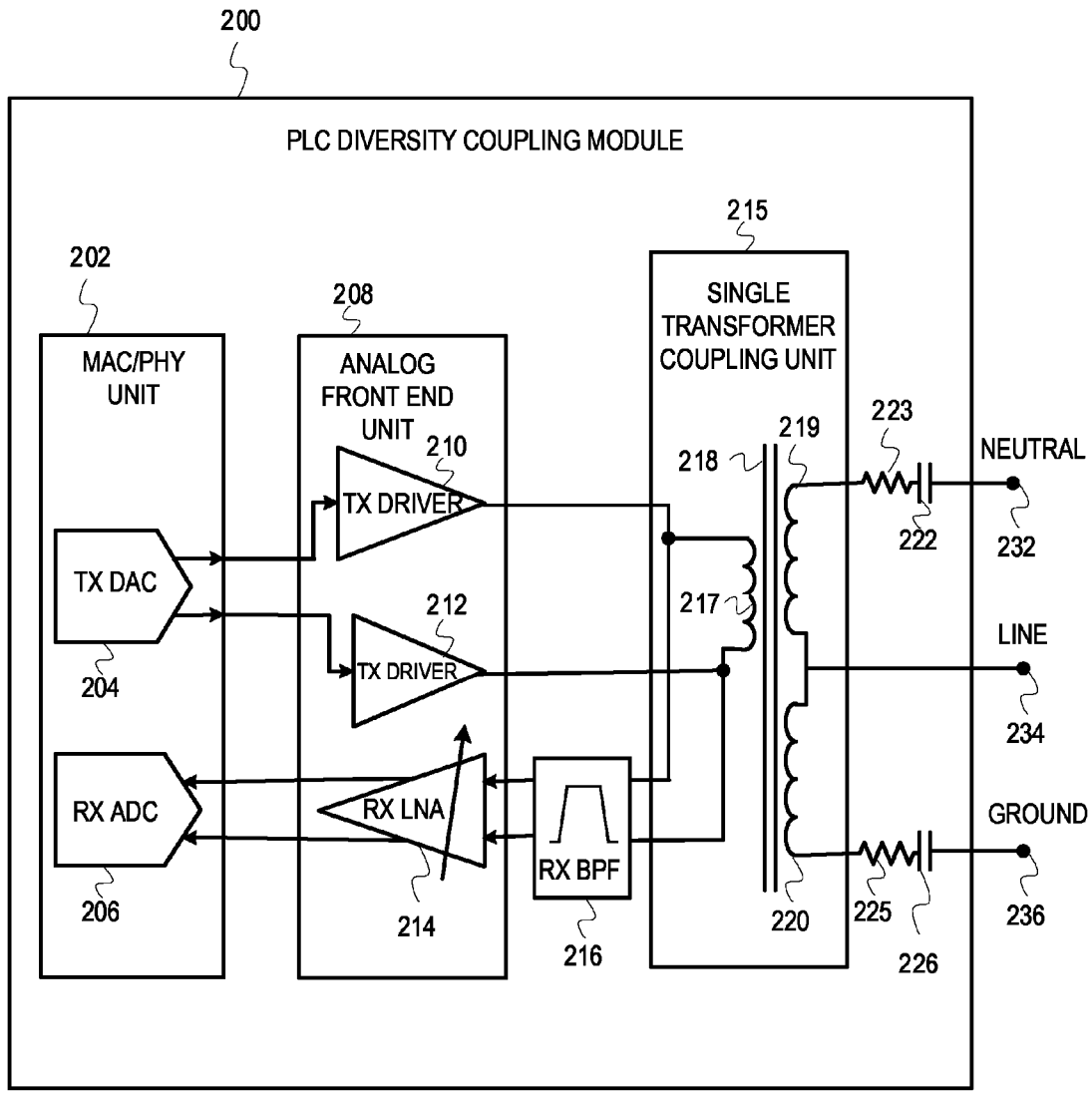
FIG. 2 depicts an example conceptual diagram of a PLC diversity coupling module having a single transformer coupling unit.

FIG. 2 depicts an example conceptual diagram of a PLC diversity coupling module 200 having a single transformer coupling unit 215. As illustrated, the PLC diversity coupling module 200 is similar to the PLC diversity coupling module 100 as described above with reference to FIG. 1, however the PLC diversity coupling module 200 can utilize the single transformer coupling unit 215. The single transformer coupling unit 215 comprises a coupling transformer 218. In one implementation, the coupling transformer 218 includes a single low voltage (or primary) transformer winding 217 and two high voltage (or secondary) windings 219 and 220). The PLC diversity coupling module 200 includes a MAC/PHY unit 202, similar to the MAC/PHY unit 102, having a TX DAC 204 and an RX ADC 206 which are similar to the TX DAC 104 and the RX ADC 106, respectively. The PLC diversity coupling module 200 may also include an analog front end unit 208 having a TX driver 210, a TX driver 212 and an RX LNA 214, which are similar to the TX driver 110, the TX driver 112 and the RX LNA 114, respectively of the AFE unit 108 in FIG. 1.

In some implementations, the analog front end unit 208 may include a single TX driver in place of the TX drivers 110 and 112. The PLC diversity coupling module 200 may also include an RX BPF 216, a neutral wire 232, a line wire 234 and a ground wire 236 similar to the RX BPF 116, the neutral wire 132, the line wire 134 and the ground wire 136. The PLC diversity coupling module 200 can include a coupling capacitor 222, and a coupling capacitor 226 similar to the coupling capacitor 122 and 126, respectively. The PLC diversity coupling module 200 may not include a coupling capacitor for the line wire 234, and illustrates one implementation of the PLC diversity coupling module 100 as mentioned in FIG. 1 (without the coupling capacitor 124). In one implementation, the high voltage winding 219 can be coupled with the neutral wire 232 via the coupling capacitor 222 and a resistor 223. The high voltage winding 219 can also be coupled with the line wire 234 (i.e., the high voltage winding 220 is coupled with the Line/Neutral channel). For example, a first terminal of the high voltage winding 219 is coupled with a neutral wire connector configured to couple to the neutral wire 232 (via the coupling capacitor 222 and the resistor 223), and the second terminal of the high voltage winding 219 is coupled with a line wire connector configured to couple with the line wire 234. Similarly, the high voltage winding 220 can be coupled with the line wire 234. The high voltage winding 220 can also be coupled with the ground wire 236 via the coupling capacitor 226 and a resistor 225 (i.e., the high voltage winding 220 is coupled with the Line/Ground channel). For example, a first terminal of the high voltage winding 220 is coupled with the line wire connector configured to couple with the line wire 234, and the second terminal of the high voltage winding 220 is coupled with a ground wire connector configured to couple with the ground wire 236 (via the coupling capacitor 226 and the resistor 225). The resistors 223 and 225 limit surge currents and provide isolation for the TX drivers 210 and 212 from high magnitude currents.

Furthermore, as shown in FIG. 2, the first terminal of the low voltage winding 217 may be coupled with the TX driver 210 and also to the first input terminal of the RX BPF 216. The second terminal of the low voltage winding 217 may be coupled with the TX driver 212 and also to the second input terminal of the RX BPF 216. In some implementations, when the analog front end unit 208 includes the single TX driver in place of the TX drivers 110 and 112, the low voltage winding 217 may be coupled to the output terminals of the single TX driver. The first output terminal of the RX BPF 216 may be coupled with the first input terminal of the RX LNA 214, and the second output terminal of the RX BPF 216 may be coupled with the second input terminal of the RX LNA 214. The output terminals of the RX LNA 214 may be coupled with the RX ADC 206, and the TX DAC 204 may be coupled with the TX drivers 210 and 212.

During a transmit mode, the coupling transformer 218 couples a communication signal in equal proportions to the high voltage windings 219 and 220. During a receive mode, the coupling transformer 218 combines communication signals received on the Line/Neutral and Line/Ground channels in equal proportions and couples a combined signal to the low voltage winding 217. In the depicted embodiment, the number of turns in the low voltage winding 217, the high voltage winding 219 and the high voltage winding 220 are equal. In some implementations, an unequal number of turns on either of the windings of the coupling transformer 218 can allow unequal splitting/combining of communication signals. The PLC diversity coupling module 200 allows further savings in hardware costs and power consumption in comparison to the PLC diversity coupling module 100 by using a single coupling transformer.

In some implementations, the coupling transformer 218 includes two low voltage windings. A first low voltage winding is coupled to the TX drivers 210 and 212. A second low voltage winding is coupled to the RX BPF 216. The first low voltage winding and the second low voltage winding may have an unequal number of turns. The unequal number of turns allows the transmit path for the Line/Neutral and Line/Ground channels to have a different turns ratio than the receive path for the Line/Neutral and Line/Ground channels.

Figure 3A:
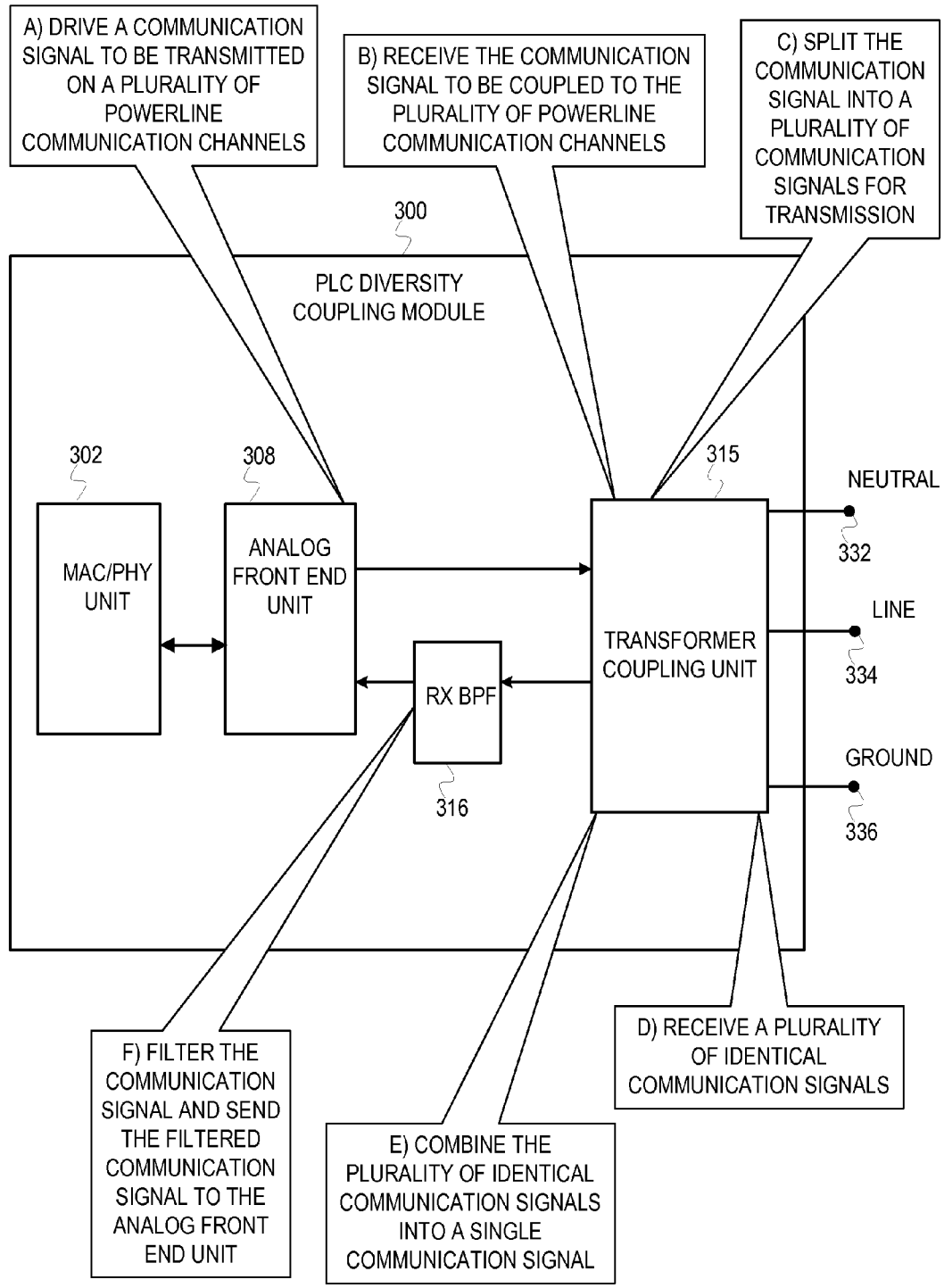
FIG. 3A depicts an example conceptual diagram of operations to transmit and receive communication signals on a plurality of powerline communication channels using a PLC diversity coupling module.

FIG. 3A depicts an example conceptual diagram of operations to transmit and receive communication signals on a plurality of powerline communication channels using a PLC diversity coupling module 300. The PLC diversity coupling module 300 may be the PLC diversity coupling module 100 (as described above with reference to FIG. 1), or the PLC diversity coupling module 200 (as described above with reference to FIG. 2). The PLC diversity coupling module 300 includes a MAC/PHY unit 302, an AFE unit 308, and an RX BPF 316, which are similar to the MAC/PHY unit 102, the AFE unit 108, and the RX BPF 116 as described above with reference to FIG. 1. The PLC diversity coupling module 300 also includes a transformer coupling unit 315, a neutral wire 332, a line wire 334 and a ground wire 336. In one implementation, the transformer coupling unit 315 includes a single transformer coupling unit as described above in the PLC diversity coupling module 200 with reference to FIG. 2. In another implementation, transformer coupling unit 315 includes a dual transformer coupling unit as described above in the PLC diversity coupling module 100 with reference to FIG. 1. For simplification, the PLC diversity coupling module 300 does not include all components (e.g., capacitors, resistors, etc.) and does not depict high voltage and low voltage windings in the transformer coupling unit 315. FIG. 3A depicts the operations for transmitting a communication signal on a plurality of powerline communication channels (e.g., a Line/Neutral channel and a Line/Ground channel) in a sequence of stages A-C. FIG. 3A also depicts the operations for receiving communication signals from the plurality of powerline communication channels in a sequence of stages D-F. It is noted that FIG. 3A emphasizes on the operations performed by one or more components in the transformer coupling unit 315, and FIG. 3A does not depict all operations performed by other components of the PLC diversity coupling module 300.

At stage A, the AFE unit 308 drives a communication signal to be transmitted on the plurality of powerline communication channels. In one implementation, the AFE unit 308 amplifies an analog signal received from a digital-to-analog converter in the MAC/PHY unit 302. The AFE unit 308 sends the communication signal to the transformer coupling unit 315.

At stage B, the transformer coupling unit 315 receives the communication signal to be coupled to the plurality of powerline communication channels. In one implementation, the transformer coupling unit 315 receives the communication signal on a single low voltage winding. In another implementation, the transformer coupling unit 315 receives the communication signal on a plurality of low voltage windings. Each of the plurality of low voltage windings corresponds to the plurality of powerline communication channels. The transformer coupling unit 315 couples the communication signal from the low voltage winding (or the plurality of low voltage windings) to a plurality of high voltage windings. Each of the plurality of the high voltage windings are coupled to a powerline communication channel. For example, a first high voltage winding is coupled to a Line/Neutral channel, with the first terminal of the first high voltage winding coupled to a neutral wire connector configured to couple to the neutral wire 332 and the second terminal of the first high voltage winding coupled to a line wire connector configured to couple to the line wire 334. Similarly, a second high voltage winding is coupled to a Line/Ground channel, with the first terminal of the second high voltage winding coupled to the line wire connector configured to couple to the line wire 334 and the second terminal of the second high voltage winding coupled to a ground wire connector configured to couple to the ground wire 336.

At stage C, the transformer coupling unit 315 splits the communication signal into a plurality of communication signals for transmission. In one implementation, the transformer coupling unit 315 splits the communication signal into a plurality of communication signals based on impedances of the plurality of powerline communication channels. For example, if the impedance offered by the Line/Neutral channel and the Line/Ground channel are equal, the transformer coupling unit 315 splits the communication signal into the plurality of communication signals in equal proportions. For example, the communication signal is transmitted in equal proportions over the Line/Neutral communication channel and the Line/Ground communication channel shown in FIG. 3A.

At stage D, the transformer coupling unit 315 receives a plurality of communication signals. In one implementation, the transformer coupling unit 315 receives the plurality of communication signals on the plurality of powerline communication channels. For example, the transformer coupling unit 315 receives substantially identical communication signals on the Line/Neutral and Line/Ground channels.

At stage E, the transformer coupling unit 315 combines the plurality of communication signals received via the plurality of powerline communication channels into a single communication signal (i.e., a single differential signal). In one implementation, the transformer coupling unit 315 combines the plurality of communication signals into the communication signal based on impedances of the plurality of powerline communication channels. For example, if the impedance offered by the Line/Neutral communication channel and the Line/Ground communication channel are equal, the transformer coupling unit 315 combines the plurality of communication signals in equal proportions.

At stage F, the RX BPF 316 filters the communication signal and sends the filtered communication signal to the AFE unit 308. In one implementation, the RX BPF 316 filters the communication signal (i.e., the communication signal received from the transformer coupling unit 315) to remove any frequency components outside a powerline communication band (e.g., 1.8 MHz-60 MHz). The RX BPF 316 sends the filtered communication signal to the AFE unit 308. Although FIG. 3A depicts the RX BPF 318 filtering the communication signal and sending the filtered communication signal to the AFE unit 308, it is noted that in other implementations other types of frequency selective or signal conditioning units may be utilized to filter the communication signal and send the communication signal to the AFE unit 308.

It is noted that the operations for transmitting a communication signal on a plurality of powerline communication channels (stages A-C) and the operations for receiving communication signals from the plurality of powerline communication channels (stages D-F) are independent of each other. In some cases, the operations of stages A-C and D-F may occur in parallel, at different times, and may not occur sequentially).

Figure 3B:
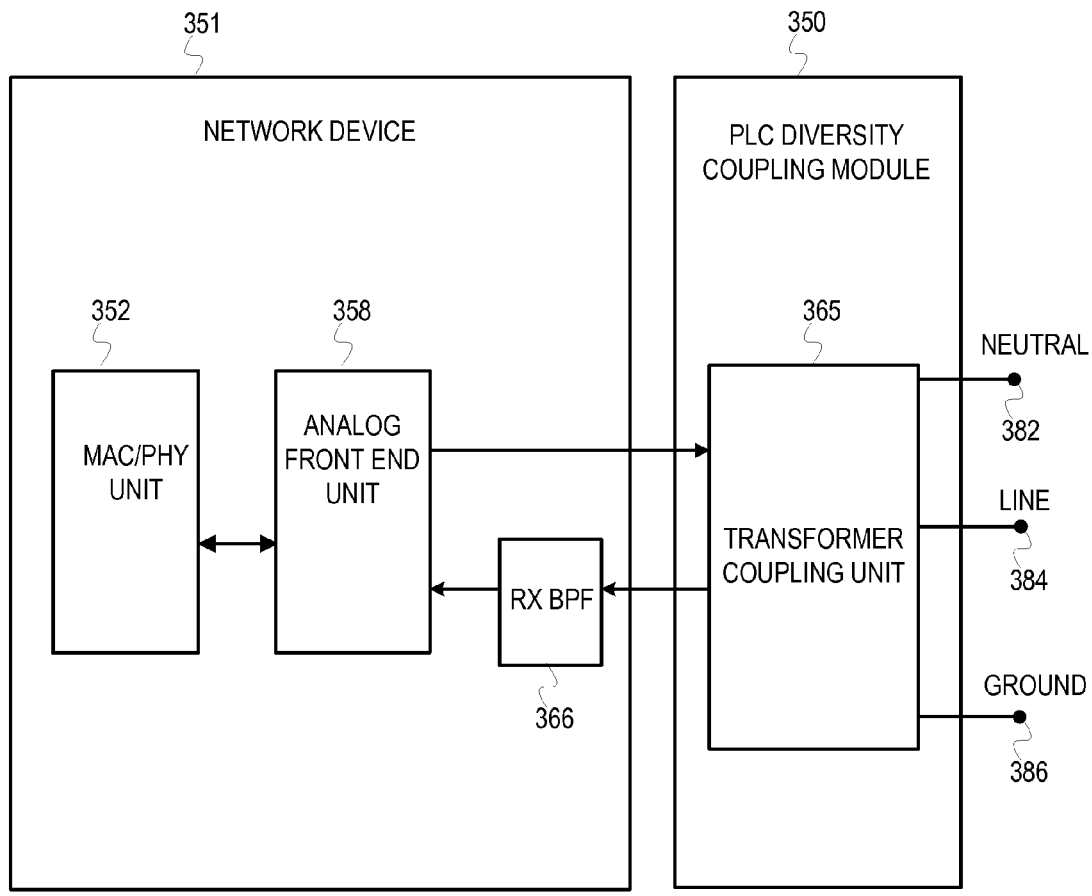
FIG. 3B depicts a block diagram of an additional implementation of a PLC diversity coupling module.

FIG. 3B depicts a block diagram of an additional implementation of a PLC diversity coupling module 350. The PLC diversity coupling module 350 may be a standalone plugin module that can be interfaced to a network device 351 (e.g., a powerline communication device). The network device 351 includes a MAC/PHY unit 352, an analog front end unit 358, and an RX BPF 356, which are similar to the MAC/PHY unit 102, the analog front end unit 108, and the RX BPF 116 as described above with reference to FIG. 1. The PLC diversity coupling module 350 includes a transformer coupling unit 365, a neutral wire 382, a line wire 384 and a ground wire 386. In one implementation, the transformer coupling unit 365 includes a single transformer coupling unit as described above in the PLC diversity coupling module 200 with reference to FIG. 2. In another implementation, transformer coupling unit 365 includes a dual transformer coupling unit as described above in the PLC diversity coupling module 100 with reference to FIG. 1. For simplification, the PLC diversity coupling module 350 does not include all components (e.g., capacitors, resistors, etc.) and does not depict high voltage and low voltage windings. The PLC diversity coupling module 350 is capable of implementing the functionalities of the PLC diversity coupling module 100 or the PLC diversity coupling module 200. The transformer coupling unit 365 in the PLC diversity coupling module 350 receives a communication signal to be transmitted from the analog front end unit 358 and couples the communication signal on the Line/Neutral and Line/Ground channels. The transformer coupling unit 365 couples the communication signals received on the Line/Neutral and Line/Ground channels to the RX BPF 356.

Although, FIGS. 1-3 illustrate a PLC diversity coupling module implementing two channel diversity using Line/Neutral and Line/Ground channels, embodiments are not limited to utilizing the Line/Neutral and Line/Ground channels. Any two available channels from multiple channels (e.g., a Line/Neutral channel, a Line/Ground channel, and a Neutral/Ground channel, etc.) in a PLC system may be utilized in different implementations. The PLC diversity coupling module is not limited to implementing two channel diversity and similar techniques can be utilized to implement three channel diversity, N-channel diversity, etc.

It is further noted that the PLC diversity coupling module is not limited to splitting a communication signal into a plurality of communication signals based on impedances of the plurality of powerline communication channels. Similarly, the PLC diversity coupling module is not limited to combining the signals received on the plurality of the powerline communication channels based on impedances of the respective powerline communication channels. In some embodiments, the PLC diversity coupling module may split a communication signal based on certain user configurations or certain preset conditions. Similarly, the PLC diversity coupling module may combine a plurality of communication signals based on certain user configurations or certain preset conditions.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a network device 400 (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 4:
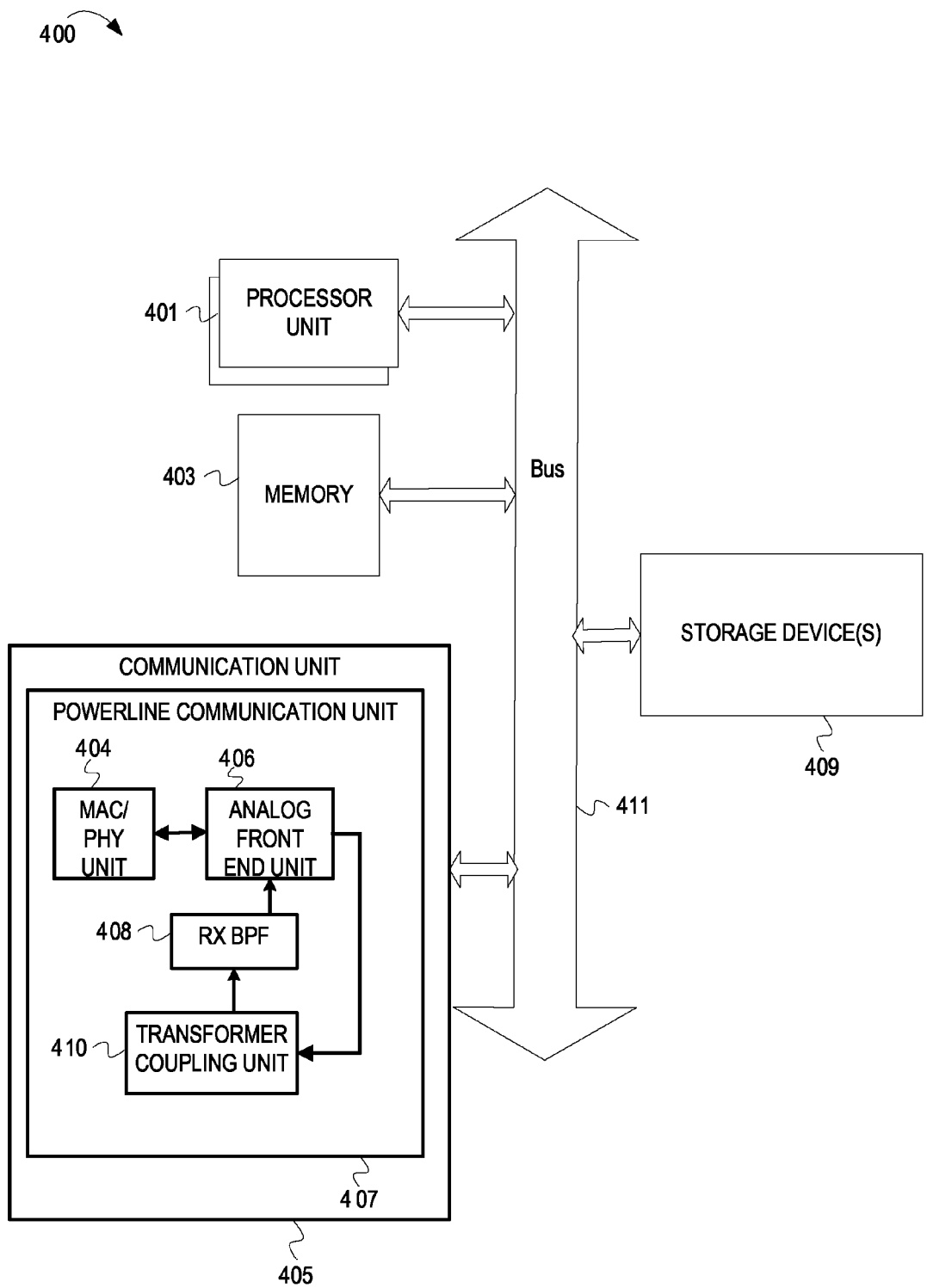
FIG. 4 depicts a block diagram of an example network device.

FIG. 4 depicts a block diagram of an example network device 400. In some implementations, the network device 400 may be one of a desktop computer, laptop computer, a tablet computer, a mobile phone, a smart appliance, a gaming console, etc. The network device 400 includes a processor unit 401 (possibly including multiple processors, multiple cores, multiple nodes, and/or implementing multi-threading, etc.). The network device 400 includes memory 403. The memory 403 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The network device 400 also includes a bus 411 (e.g., PCI, PCI-Express, AHB™, AXI™, NoC, etc.), a communication unit 405 having a powerline communication unit 407, and a storage device(s) 409 (e.g., optical storage, magnetic storage, network attached storage, etc.). The powerline communication unit 407 may include a MAC/PHY unit 404, an AFE unit 406, an RX BPF 408 and a transformer coupling unit 410, which may be configured similarly as described above with reference to FIGS. 1-3B and also implement the corresponding functionality to facilitate coupling of powerline communication signals across multiple powerline communication channels. Any one of these functionalities may be partially (or entirely) implemented in hardware or an application specific integrated circuit. Further, realizations may include fewer or additional components not illustrated in FIG. 4 (e.g., video cards, audio cards, additional network interfaces, peripheral devices, etc.). The processor unit 401, the storage device(s) 409, and the communication unit 405 are coupled to the bus 411. Although illustrated as being coupled to the bus 411, the memory 403 may be coupled to the processor unit 401.

While the embodiments are described with reference to various implementations and exploitations, it will be understood that these embodiments are illustrative and that the scope of the inventive subject matter is not limited to them. In general, PLC diversity coupling techniques as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. An apparatus comprising:
an analog front end unit including a first transmitter driver and a second transmitter driver; and
a transformer coupling unit coupled with the analog front end unit to receive a differential communication signal from the first and second transmitter drivers, the transformer coupling unit comprising at least one transformer, the transformer coupling unit configured to:
split the differential communication signal into a first differential communication signal and a second differential communication signal, and
transmit the first differential communication signal over a first powerline communication channel and the second differential communication signal over a second powerline communication channel of a powerline communication network.

2. The apparatus of claim 1, wherein the transformer coupling unit comprises a first transformer and a second transformer, and wherein the transformer coupling unit is further configured to:
couple the differential communication signal to first and second terminals of a primary winding of the first transformer and to first and second terminals of a primary winding of the second transformer to split the differential communication signal into the first differential communication signal and the second differential communication signal.

3. The apparatus of claim 2, wherein the transformer coupling unit is further configured to couple the first differential communication signal to the first powerline communication channel via first and second terminals of a secondary winding of the first transformer and couple the second differential communication signal to the second powerline communication channel via first and second terminals of a secondary winding of the second transformer.

4. The apparatus of claim 1, wherein the transformer coupling unit comprises a transformer, and wherein the transformer coupling unit is further configured to:
receive the differential communication signal at first and second terminals of a primary winding of the transformer; and
couple the differential communication signal to first and second terminals of a first secondary winding of the transformer and to first and second terminals of a second secondary winding of the transformer to split the differential communication signal into the first differential communication signal and the second differential communication signal.

5. The apparatus of claim 4, wherein the transformer coupling unit is further configured to couple the first differential communication signal to the first powerline communication channel via the first and second terminals of the first secondary winding of the transformer and couple the second differential communication signal to the second powerline communication channel via the first and second terminals of the second secondary winding of the transformer.

6. The apparatus of claim 1, wherein:
the transformer coupling unit further comprises:
a first transformer comprising a primary winding and a secondary winding, and a second transformer comprising a primary winding and a secondary winding; and the analog front end unit further comprises:
a receiver amplifier,
wherein
the first transmitter driver is coupled with a first terminal of the primary winding of the first transformer and a first terminal of the primary winding of the second transformer,
the second transmitter driver is coupled with a second terminal of the primary winding of the first transformer and a second terminal of the primary winding of the second transformer,
the receiver amplifier is coupled with the first terminal and the second terminal of the primary winding of the first transformer and with the first terminal and the second terminal of the primary winding of the second transformer,
the secondary winding of the first transformer is coupled with the first powerline communication channel, and
the secondary winding of the second transformer is coupled with the second powerline communication channel.

7. The apparatus of claim 6, further comprising:
a band-pass filter coupled between the primary winding of the first transformer and the receiver amplifier and between the primary winding of the second transformer and the receiver amplifier.

8. The apparatus of claim 1, wherein:
the transformer coupling unit further comprises:
a transformer comprising a primary winding, a first secondary winding, and a second secondary winding; and
the analog front end unit further comprises:
a receiver amplifier,
wherein
the first transmitter driver is coupled with a first terminal of the primary winding of the transformer,
the second transmitter driver is coupled with a second terminal of the primary winding of the transformer,
the receiver amplifier is coupled with the first terminal and the second terminal of the primary winding of the transformer,
the first secondary winding of the transformer is coupled with the first powerline communication channel, and
the second secondary winding of the transformer is coupled with the second powerline communication channel.

9. The apparatus of claim 1, wherein the transformer coupling unit comprises a first transformer comprising a primary winding and a secondary winding, and a second transformer comprising a primary winding and a secondary winding, and wherein,
the first powerline communication channel is a line-neutral powerline communication channel of the powerline communication network,
a first terminal of the secondary winding of the first transformer is coupled with a neutral wire connector configured to couple to a neutral wire of the line-neutral powerline communication channel,
a second terminal of the secondary winding of the first transformer is coupled with a line wire connector configured to couple to a line wire of the line-neutral powerline communication channel,
the second powerline communication channel is a line-ground powerline communication channel of the powerline communication network,
a first terminal of the secondary winding of the second transformer is coupled with the line wire connector configured to couple to the line wire of the line-ground powerline communication channel, and
a second terminal of the secondary winding of the second transformer is coupled with a ground wire connector configured to couple to a ground wire of the line-ground powerline communication channel.

10. The apparatus of claim 1, wherein the transformer coupling unit comprises a transformer comprising a primary winding, a first secondary winding, and a second secondary winding, and wherein,
the first powerline communication channel is a line-neutral powerline communication channel of the powerline communication network,
a first terminal of the first secondary winding of the transformer is coupled with a neutral wire connector configured to couple to a neutral wire of the line-neutral powerline communication channel,
a second terminal of the first secondary winding of the transformer is coupled with a line wire connector configured to couple to a line wire of the line-neutral powerline communication channel,
the second powerline communication channel is a line-ground powerline communication channel of the powerline communication network,
a first terminal of the second secondary winding of the transformer is coupled with the line wire connector configured to couple to the line wire of the line-ground powerline communication channel, and
a second terminal of the second secondary winding of the transformer is coupled with a ground wire connector configured to couple to a ground wire of the line-ground powerline communication channel.

11. The apparatus of claim 1, wherein the transformer coupling unit comprises a first transformer and a second transformer, and wherein the transformer coupling unit is further configured to split the differential communication signal based, at least in part, on impedances of the first powerline communication channel and the second powerline communication channel.

12. An apparatus comprising:
an analog front end unit; and
a transformer coupling unit coupled with the analog front end unit, the transformer coupling unit comprising at least one transformer, the transformer coupling unit configured to:
combine a plurality of differential communication signals received from a plurality of powerline communication channels of a powerline communication network into a combined differential communication signal, and
couple the combined differential communication signal to the analog front end unit.

13. The apparatus of claim 12, wherein the transformer coupling unit comprises a first transformer and a second transformer, wherein the plurality of differential communication signals comprises at least a first differential communication signal and a second differential communication signal, and wherein the transformer coupling unit is further configured to:
receive the first differential communication signal on first and second terminals of a secondary winding of the first transformer and the second differential communication signal on first and second terminals of a secondary winding of the second transformer; and
couple the first differential communication signal to first and second terminals of a primary winding of the first transformer and the second differential communication signal to first and second terminals of a primary winding of the second transformer to combine the first differential communication signal and the second differential communication signal.

14. The apparatus of claim 12, wherein the transformer coupling unit is further configured to provide the combined differential communication signal to a band-pass filter, wherein the band-pass filter is configured to provide the combined differential communication signal to a receiver amplifier of the analog front end unit.

15. The apparatus of claim 12, wherein the transformer coupling unit comprises a transformer, wherein the plurality of differential communication signals comprises at least a first differential communication signal and a second differential communication signal, and wherein the transformer coupling unit is further configured to:
receive the first differential communication signal on first and second terminals of a first secondary winding of the transformer and the second differential communication signal on first and second terminals of a second secondary winding of the transformer; and
couple the first differential communication signal to first and second terminals of a primary winding of the transformer and the second differential communication signal to the first and second terminals of the primary winding of the transformer to combine the first differential communication signal and the second differential communication signal.

16. The apparatus of claim 15, wherein the transformer coupling unit is further configured to provide the combined differential communication signal from the primary winding of the transformer to a band-pass filter, wherein the band-pass filter is configured to provide the combined differential communication signal to a receiver amplifier of the analog front end unit.

17. The apparatus of claim 12, wherein:
the transformer coupling unit further comprises:
a first transformer comprising a primary winding and a secondary winding, and a second transformer comprising a primary winding and a secondary winding; and
the analog front end unit further comprises:
a first transmitter driver, a second transmitter driver, and a receiver amplifier, wherein
the first transmitter driver is coupled with a first terminal of the primary winding of the first transformer and a first terminal of the primary winding of the second transformer,
the second transmitter driver is coupled with a second terminal of the primary winding of the first transformer and a second terminal of the primary winding of the second transformer,
the receiver amplifier is coupled with the first terminal and the second terminal of the primary winding of the first transformer and with the first terminal and the second terminal of the primary winding of the second transformer,
the secondary winding of the first transformer is coupled with a first powerline communication channel, and
the secondary winding of the second transformer is coupled with a second powerline communication channel.

18. The apparatus of claim 17, further comprising:
a band-pass filter coupled between the primary winding of the first transformer and the receiver amplifier and between the primary winding of the second transformer and the receiver amplifier.

19. The apparatus of claim 12, wherein:
the transformer coupling unit further comprises:
a transformer comprising a primary winding, a first secondary winding, and a second secondary winding; and
the analog front end unit further comprises:
a first transmitter driver, a second transmitter driver, and a receiver amplifier, wherein
the first transmitter driver is coupled with a first terminal of the primary winding of the transformer,
the second transmitter driver is coupled with a second terminal of the primary winding of the transformer,
the receiver amplifier is coupled with the first terminal and the second terminal of the primary winding of the transformer,
the first secondary winding of the transformer is coupled with a first powerline communication channel, and
the second secondary winding of the transformer is coupled with a second powerline communication channel.

20. The apparatus of claim 12, wherein the transformer coupling unit comprises a first transformer having a primary winding and a secondary winding, and a second transformer having a primary winding and a secondary winding, wherein the plurality of powerline communication channels comprises at least a first powerline communication channel and a second powerline communication channel, and wherein,
the first powerline communication channel is a line-neutral powerline communication channel of the powerline communication network,
a first terminal of the secondary winding of the first transformer is coupled with a neutral wire connector configured to couple to a neutral wire of the line-neutral powerline communication channel,
a second terminal of the secondary winding of the first transformer is coupled with a line wire connector configured to couple to a line wire of the line-neutral powerline communication channel,
the second powerline communication channel is a line-ground powerline communication channel of the powerline communication network,
a first terminal of the secondary winding of the second transformer is coupled with the line wire connector configured to couple to the line wire of the line-ground powerline communication channel, and
a second terminal of the secondary winding of the second transformer is coupled with a ground wire connector configured to couple to a ground wire of the line-ground powerline communication channel.

21. The apparatus of claim 12, wherein the transformer coupling unit comprises a transformer having a primary winding, a first secondary winding, and a second secondary winding, wherein the plurality of powerline communication channels comprises at least a first powerline communication channel and a second powerline communication channel, and wherein,
the first powerline communication channel is a line-neutral powerline communication channel of the powerline communication network,
a first terminal of the first secondary winding of the transformer is coupled with a neutral wire connector configured to couple to a neutral wire of the line-neutral powerline communication channel,
a second terminal of the first secondary winding of the transformer is coupled with a line wire connector configured to couple to a line wire of the line-neutral powerline communication channel, the second powerline communication channel is a line-ground powerline communication channel of the powerline communication network, a first terminal of the second secondary winding of the transformer is coupled with the line wire connector configured to couple to the line wire of the line-ground powerline communication channel, and a second terminal of the second secondary winding of the transformer is coupled with a ground wire connector configured to couple to a ground wire of the line-ground powerline communication channel.

22. The apparatus of claim 12, wherein the transformer coupling unit is further configured to combine the plurality of differential communication signals based, at least in part, on impedances of each of the plurality of powerline communication channels.

23. The apparatus of claim 12, wherein the plurality of differential communication signals comprises at least a first differential communication signal and a second differential communication signal, and wherein the first differential communication signal and the second differential communication signal are substantially identical.

24. A method for signal transmission in a powerline communication network, the method comprising:

processing, by an analog front end unit, a differential communication signal for transmission in the powerline communication network;

splitting, by a transformer coupling unit, the differential communication signal into a first differential communication signal and a second differential communication signal, wherein the transformer coupling unit comprises at least one transformer; and transmitting the first differential communication signal over a first powerline communication channel and the second differential communication signal over a second powerline communication channel of the powerline communication network.

25. The method of claim 24, wherein the transformer coupling unit comprises a first transformer and a second transformer, wherein said splitting the differential communication signal comprises:

receiving, by the transformer coupling unit, the differential communication signal from the analog front end unit; and coupling the differential communication signal to first and second terminals of a primary winding of the first transformer and to first and second terminals of a primary winding of the second transformer to split the differential communication signal into the first differential communication signal and the second differential communication signal.

26. The method of claim 24, wherein the transformer coupling unit comprises a transformer, wherein said splitting the differential communication signal comprises:

receiving the differential communication signal at first and second terminals of a primary winding of the transformer; and coupling the differential communication signal to first and second terminals of a first secondary winding of the transformer and to first and second terminals of a second secondary winding of the transformer to split the differential communication signal into the first differential communication signal and the second differential communication signal.

27. The method of claim 24, further comprising splitting the differential communication signal into the first differential communication signal and the second differential communication signal based, at least in part, on impedances of the first powerline communication channel and the second powerline communication channel.

28. The method of claim 24, wherein said splitting the differential communication signal comprises splitting the differential communication signal into the first differential communication signal and the second differential communication signal in equal proportions.

29. The method of claim 24, wherein said splitting the differential communication signal comprises splitting the differential communication signal into the first differential communication signal and the second differential communication signal in unequal proportions.

30. A method for signal reception in a powerline communication network, the method comprising:

receiving, by a transformer coupling unit, a plurality of differential communication signals via a plurality of powerline communication channels of the powerline communication network, wherein the transformer coupling unit comprises at least one transformer;

combining, by the transformer coupling unit, the plurality of differential communication signals into a combined differential communication signal using the transformer coupling unit; and coupling the combined differential communication signal to an analog front end unit for processing the combined differential communication signal.

31. The method of claim 30, wherein the transformer coupling unit comprises a first transformer and a second transformer, wherein said combining the plurality of differential communication signals comprises:

receiving a first differential communication signal on first and second terminals of a secondary winding of the first transformer and a second differential communication signal on first and second terminals of a secondary winding of the second transformer; and coupling the first differential communication signal to first and second terminals of a primary winding of the first transformer and the second differential communication signal to first and second terminals of a primary winding of the second transformer to combine the first differential communication signal and the second differential communication signal.

32. The method of claim 30, wherein the transformer coupling unit comprises a transformer, wherein said combining the plurality of differential communication signals comprises:

receiving a first differential communication signal on first and second terminals of a first secondary winding of the transformer and receive a second differential communication signal on first and second terminals of a second secondary winding of the transformer; and coupling the first differential communication signal and the second differential communication signal to first and second terminals of a primary winding of the transformer to combine the first differential communication signal and the second differential communication signal.

33. The method of claim 30, further comprising combining the plurality of differential communication signals based, at least in part, on impedances of each of the plurality of powerline communication channels.

34. The method of claim 30, wherein said combining the plurality of differential communication signals comprises combining the plurality of differential communication signals into the combined differential communication signal in equal proportions.

35. The method of claim 30, wherein said combining the plurality of differential communication signals comprises combining the plurality of differential communication signals into the combined differential communication signal in unequal proportions.

36. An apparatus comprising:
an analog front end unit comprising a first transmitter driver, a second transmitter driver, and a receiver amplifier; and
a transformer coupling unit coupled with the analog front end unit to receive a first differential communication signal from the first and second transmitter drivers, the transformer coupling unit comprising at least one transformer, the transformer coupling unit configured to:
split the first differential communication signal into a second differential communication signal and a third differential communication signal,
couple the second differential communication signal to a first powerline communication channel and the third differential communication signal to a second powerline communication channel for transmission via a powerline communication network,
receive a fourth differential communication signal via the first powerline communication channel from the powerline communication network and a fifth differential communication signal via the second powerline communication channel from the powerline communication network,
combine the fourth differential communication signal and the fifth differential communication signal into a combined differential communication signal, and
couple the combined differential communication signal to the receiver amplifier.

37. The apparatus of claim 36, wherein the transformer coupling unit is configured to both split the first differential communication signal into the second differential communication signal and the third differential communication signal and combine the fourth differential communication signal and the fifth differential communication signal into the combined differential communication signal to minimize protocol overhead.

38. The apparatus of claim 36, wherein the transformer coupling unit comprises a first transformer and a second transformer, and wherein the transformer coupling unit is further configured to:
couple the first differential communication signal to first and second terminals of a primary winding of the first transformer and to first and second terminals of a primary winding of the second transformer to split the first differential communication signal into the second differential communication signal and the third differential communication signal;
couple the second differential communication signal to the first powerline communication channel via first and second terminals of a secondary winding of the first transformer and couple the third differential communication signal to the second powerline communication channel via first and second terminals of a secondary winding of the second transformer;
receive the fourth differential communication signal on the first and second terminals of the secondary winding of the first transformer and the fifth differential communication signal on the first and second terminals of the secondary winding of the second transformer; and
couple the fourth differential communication signal to the first and second terminals of the primary winding of the first transformer and the fifth differential communication signal to the first and second terminals of the primary winding of the second transformer to combine the fourth differential communication signal and the fifth differential communication signal.

39. The apparatus of claim 36, wherein the transformer coupling unit comprises a transformer, and wherein the transformer coupling unit is further configured to:
receive the first differential communication signal at first and second terminals of a primary winding of the transformer;
couple the first differential communication signal to first and second terminals of a first secondary winding of the transformer and to first and second terminals of a second secondary winding of the transformer to split the first differential communication signal into the second differential communication signal and the third differential communication signal;
receive the fourth differential communication signal on the first and second terminals of the first secondary winding of the transformer and the fifth differential communication signal on the first and second terminals of the second secondary winding of the transformer; and
couple the fourth differential communication signal to the first and second terminals of the primary winding of the transformer and the fifth differential communication signal to the first and second terminals of the primary winding of the transformer to combine the fourth differential communication signal and the fifth differential communication signal.

40. The apparatus of claim 36, wherein the transformer coupling unit is further configured to:
split the first differential communication signal into the second differential communication signal and the third differential communication signal based, at least in part, on impedances of the first powerline communication channel and the second powerline communication channel; and
combine the fourth differential communication signal and the fifth differential communication signal into the combined differential communication signal based, at least in part, on the impedances of the first powerline communication channel and the second powerline communication channel.

41. An apparatus comprising:
an analog front end unit comprising first and second transmitter drivers; and
a transformer coupling unit coupled with the analog front end unit to receive a differential signal, the transformer coupling unit comprising a transformer, the transformer coupling unit configured to:
receive, from the first and second transmitter drivers, the differential signal at first and second terminals of a primary winding of the transformer,
couple the differential signal to first and second terminals of a first secondary winding of the transformer and to first and second terminals of a second secondary winding of the transformer to split the differential signal into a first differential signal and a second differential signal, and
couple the first differential signal to a first powerline communication channel of a powerline communication network via the first secondary winding of the transformer and the second differential signal to a second powerline communication channel of the powerline communication network via the second secondary winding of the transformer.

* * * * *